United States Patent [19]

Detwiler et al.

[11] Patent Number: 5,684,289
[45] Date of Patent: Nov. 4, 1997

[54] OPTICAL SCANNER HAVING ENHANCED ITEM SIDE COVERAGE

[75] Inventors: Paul O. Detwiler; Barry M. Mergenthaler, both of Lawrenceville; Hong Tang, Suwanee, all of Ga.

[73] Assignee: NCR Corporation, Dayton, Ohio

[21] Appl. No.: 550,150

[22] Filed: Oct. 30, 1995

[51] Int. Cl.⁶ .................................................. G06K 7/10
[52] U.S. Cl. .................................... 235/467; 235/383
[58] Field of Search ........................... 235/467, 462, 235/383, 454; 359/201, 212, 216, 217, 218, 738, 739

[56] References Cited

U.S. PATENT DOCUMENTS

| | | | |
|---|---|---|---|
| 4,097,729 | 6/1978 | Seligman et al. | 235/467 |
| 4,652,732 | 3/1987 | Nickl | 235/462 |
| 4,713,532 | 12/1987 | Knowles | 235/467 |
| 4,861,973 | 8/1989 | Hellekson et al. | 235/467 |
| 4,939,355 | 7/1990 | Rando et al. | 235/467 |
| 4,960,985 | 10/1990 | Knowles | 234/467 |
| 5,019,694 | 5/1991 | Collins, Jr. | 235/462 X |
| 5,028,772 | 7/1991 | Lapinski et al. | 235/467 |
| 5,132,524 | 7/1992 | Singh et al. | 235/467 |
| 5,148,009 | 9/1992 | Lindacher | 235/462 |
| 5,206,491 | 4/1993 | Katoh et al. | 235/467 |
| 5,229,588 | 7/1993 | Detwiler et al. | 235/467 |
| 5,459,308 | 10/1995 | Detwiler et al. | 235/467 |

*Primary Examiner*—Donald T. Hajec
*Assistant Examiner*—Michael G. Lee
*Attorney, Agent, or Firm*—Paul W. Martin

[57] ABSTRACT

A dual aperture optical scanner which produces horizontal, vertical, and diagonal scan patterns. The optical scanner includes a housing having a substantially vertical surface containing a first aperture and a substantially horizontal surface containing a second aperture. A laser diode produces a laser beam. A spinner produces first, second, and third groups of scanning beams. A plurality of pattern mirrors reflects the first group of scanning beams in a substantially horizontal direction through the first aperture, the second group of scanning beams in a substantially downward diagonal direction through the first aperture, and the third group of scanning beams in a substantially vertical direction through the second aperture.

35 Claims, 7 Drawing Sheets

OPTICAL SCANNER HAVING ENHANCED ITEM SIDE COVERAGE

BACKGROUND OF THE INVENTION

The present invention relates to optical scanners and more specifically to an optical scanner having enhanced item side coverage.

U.S. Pat. No. 5,229,588 to Detwiler et al. discloses a dual aperture optical scanner which includes horizontal and vertical apertures. The scanning light beams from a single laser diode pass through these apertures to provide coverage for up to four sides of a scanned item: the side facing the vertical aperture (front), the side facing the horizontal aperture (bottom), and the left and right sides.

While this scanner requires much less item orientation than a single aperture scanner, it is not capable of scanning the top and rear sides of scanning items. Therefore, it would be desirable to provide an optical scanner which is capable of scanning as many as five sides of a typical merchandise item.

SUMMARY OF THE INVENTION

In accordance with the teachings of the present invention, an optical scanner having enhanced item side coverage is provided. The optical scanner preferably also includes a housing having first and second apertures, a laser beam source, a mirrored spinner for reflecting the laser beam in a plurality of directions, and a plurality of pattern mirrors within the housing for reflecting the laser beam from the spinner through the first and second apertures to an article having a bar code label to be scanned. Preferably, the first aperture is substantially horizontal and the second aperture is substantially vertical to maximize scan pattern coverage and to minimize required item orientation.

The optical scanner also preferably includes an optical transceiver for passing the laser beam and for collecting reflected light from the scanned article and a photodetector for generating signals representing the intensity of the light reflected from the article.

The scanner of the present invention produces horizontal, vertical, and diagonal scan patterns. A first set of pattern mirrors is positioned adjacent the horizontal aperture. A second set of pattern mirrors is positioned adjacent the vertical aperture and includes first, second, and third subsets of pattern mirrors. The spinner reflects a first group of scanning beams across the first set of pattern mirrors and out the first window, reflects a second group of scanning beams across the first and third subsets of pattern mirrors and out the second window, and reflects a third group of scanning beams across the second and third subsets of pattern mirrors and out the second window.

It is a feature of the present invention that the mirrored spinner and pattern mirrors combine to produce a plurality of scan lines which pass through the horizontal and vertical apertures. The scanner produces a scan pattern which more effectively covers multi-sided articles than single aperture scanners. The mirrored spinner includes four facets which are oriented at different angles with respect to a predetermined reference. The pattern mirrors are flat and include a first set of mirrors for reflecting the laser beam from the spinner, a second set of mirrors for reflecting the laser beam from the first set of mirrors, and for some scan lines, a third set of mirrors for reflecting the laser beam from the second set of mirrors. Preferably, the optical scanner produces forty scan lines.

It is accordingly an object of the present invention to provide an improved dual aperture optical scanner having enhanced item coverage.

It is another object of the present invention to provide an improved dual aperture optical scanner in which a first aperture is substantially vertical and a second aperture is substantially horizontal.

It is another object of the present invention to provide a dual aperture optical scanner which substantially increases the illuminated surface area of an article to be scanned.

It is another object of the present invention to provide a dual aperture optical scanner which may be suitably employ a single laser and motor for cost conscious applications in which cost may be design determinant.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
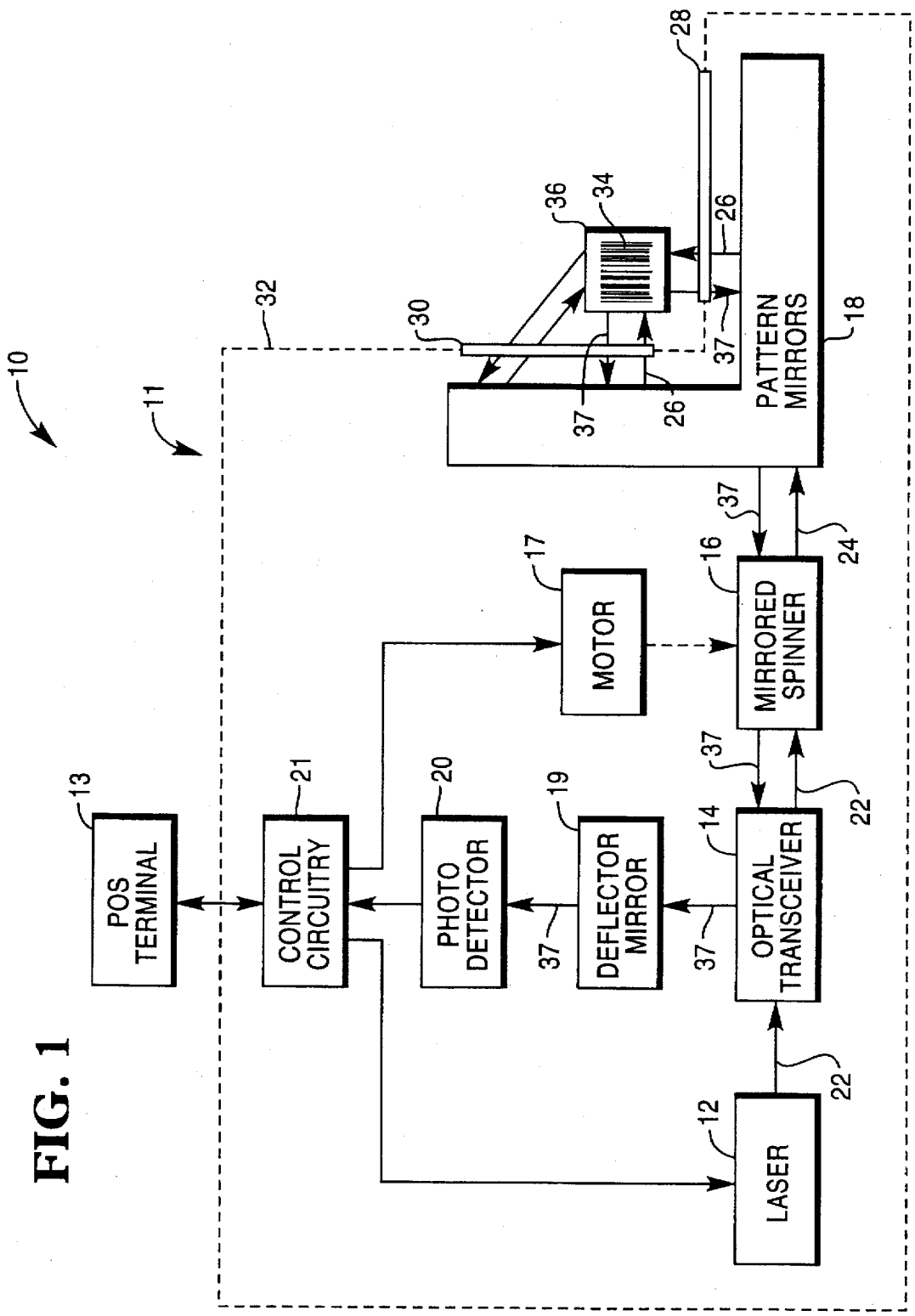
FIG. 1 is a block diagram of the optical scanner having enhanced item side coverage of the present invention.

Referring now to FIG. 1, a point-of-service (POS) system 10 includes optical scanner 11 and POS terminal 13.

POS terminal 13 receives transaction data, for example, in the form of SKU numbers from scanner 11 and completes a transaction by finding price data for the SKU numbers in a price-lookup data file.

Scanner 11 of the present invention includes laser 12, optical transceiver 14, mirrored spinner 16, pattern mirrors 18, deflector mirror 19, photodetector 20, and control circuit 21. Laser 12 includes a laser diode or other suitable laser source.

A focusing lens or lenses and a collimating aperture are also preferably used to produce a focused and collimated laser beam 22. In the preferred embodiment, the laser diode emits visible light within a wavelength range of 670–690 nm and the collimating aperture and focusing lens produce a beam 22 having a beam waist of 220 microns in the center of the read zone. Other wavelengths and beam waists may be suitably employed.

Beam 22 passes through optical transceiver 14, which includes a mirrored collecting surface and an aperture for passing beam 22. The mirrored collecting surface preferably has an ellipsoidal or other curved surface.

Figure 3:
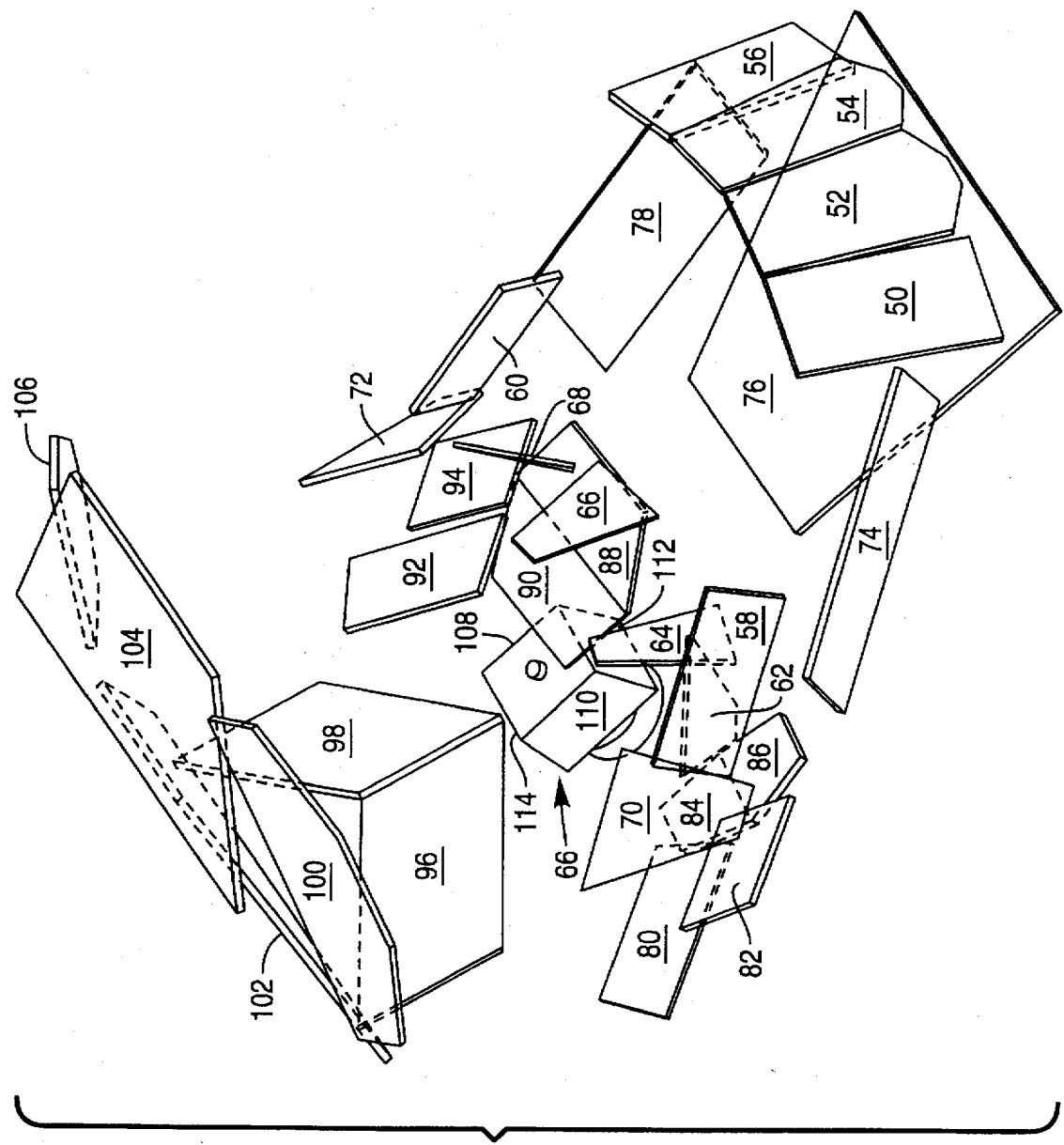
FIG. 3 is an interior perspective view of the scanner of the present invention.

Beam 22 contacts mirrored spinner 16, which preferably has four planoreflective mirrored facets 108–114 for producing scanning beams 24 (FIG. 3). Four facets were chosen as an optimal compromise between the increased line length created by using three facets and the increased rastering provided by spinners having more than four facets.

Scanning beams 24 impact pattern mirrors 18, which produce a plurality of scan lines 26. In the preferred embodiment, pattern mirrors 18 are preferably flat and produce forty scan lines 26 for each complete revolution of mirrored spinner 16. Advantageously, all forty scan lines 26 are preferably produced by only one laser 12 and motor 17. Use of a greater or lesser number of scan lines and pattern mirrors will be apparent to those skilled in the art.

Some scan lines 26 pass through a substantially horizontal aperture 28 and some pass through a substantially vertical aperture 30 in scanner housing 32 on their way to bar code label 34 on merchandise item 36. Substantially vertical aperture 30 is preferably oriented at 5¾ degrees from a vertical plane. The choice of angle is chosen to optimize the scan volume and line length of the scan lines. It is desirable to achieve a ratio of the minimum length of the longest scan line to the maximum length of the shortest scan line as close as possible to one. At about ten degrees, scanning is adversely impacted for the configuration of pattern mirrors 18 illustrated herein.

According to the present invention, scan lines 26 are divided into three groups. Scan lines within a first group (Group I) emanate outwardly and downwardly from vertical aperture 30 to illuminate the top and customer sides of an item.

Scan lines within a second group (Group II) emanate outwardly from aperture 30 as three sub-groups to illuminate the customer side (Sub-group IIa), the customer and leading sides (Sub-group IIb), and customer and trailing sides (Sub-group IIc).

Scan lines from the third group (Group III) emanate upwardly from horizontal aperture 28 as three sub-groups to illuminate the bottom (Sub-group IIIa), leading side (Sub-group IIIb), and trailing side (Sub-group IIIc).

Reflected light 37 is redirected by pattern mirrors 18 towards spinner 16, which further directs it towards optical transceiver 14. Optical transceiver 14 directs and focuses reflected light 37 at deflector mirror 19, which further directs reflected light 37 towards photodetector 20. Photodetector 20 generates electrical signals representing the intensity of reflected light 37.

Control circuitry 21 decodes bar code label 34 and controls power to laser 12 and motor 17. Control circuitry 21 may remove power from laser 12 and motor 17 to increase the longevity of laser 12 and motor 17. When scanner 11 is equipped with two lasers (FIG. 10), control circuitry 21 alternates power removal from lasers 140 and 142. For example, control circuitry 21 may remove power from laser 140 during one complete revolution of spinner 16, and remove power from laser 142 during the following revolution.

Figure 2:
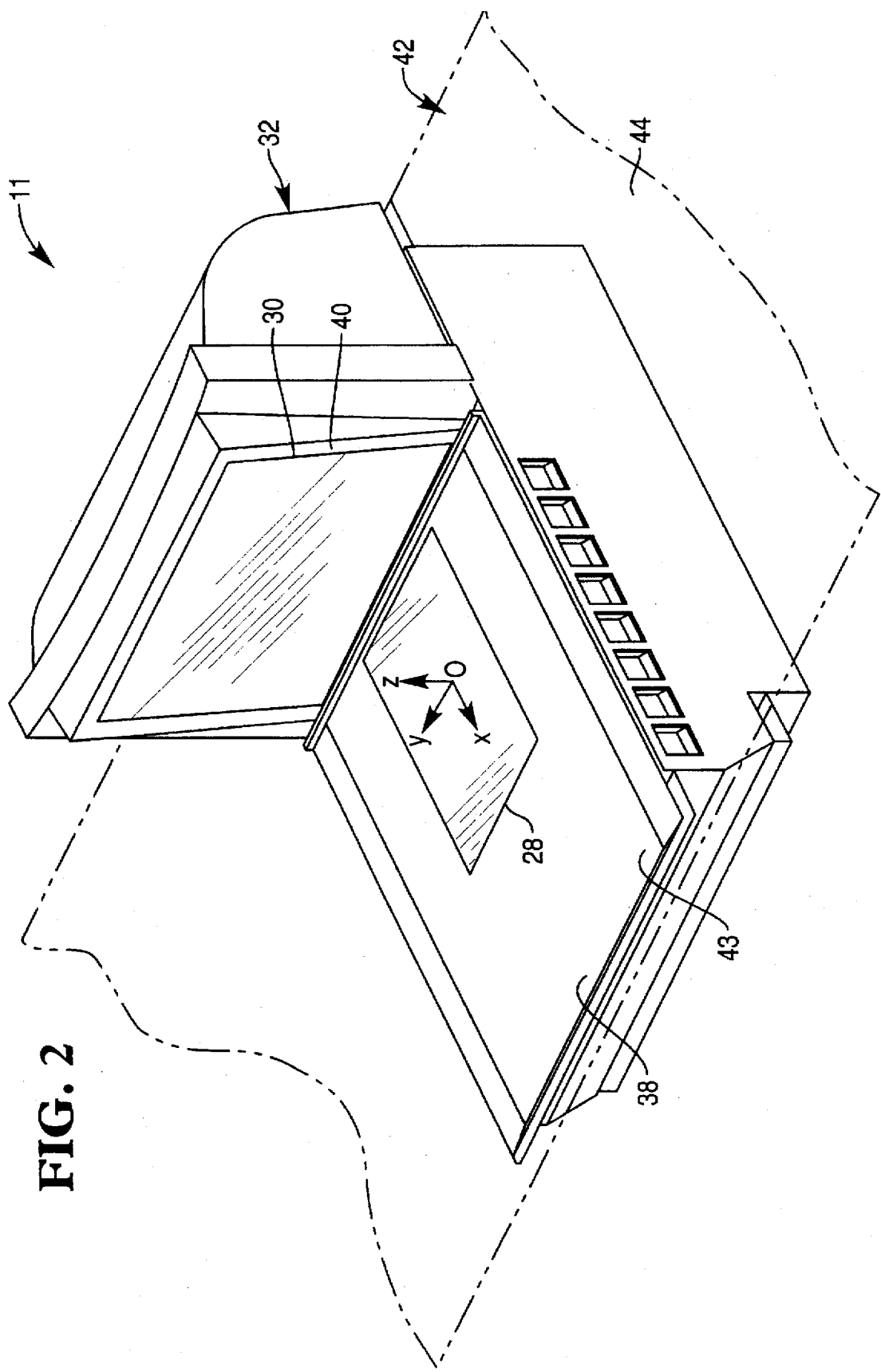
FIG. 2 is an exterior perspective view of the scanner of the present invention, including a reference coordinate system for the group of pattern mirrors within the scanner of the present invention.

Turning now to FIG. 2, scanner 11 is shown in perspective. Horizontal aperture 28 is located within substantially horizontal surface 38 of housing 32. Vertical aperture 30 is located within substantially vertical surface 40.

Preferably, scanner 11 may be easily adapted to fit in a typical checkout counter 42. Standard dimensions for apertures in checkout counters like checkout counter 42 are about eleven inches in length (i.e., in the direction of item flow), twenty inches in width (i.e., in the direction across the direction of item flow), and five inches deep. Thus, despite its improved scan coverage, scanner 11 easily fits within standard apertures. This is due to the optimal size and arrangement of components within scanner 11.

It is envisioned that top surface 38 be made substantially flush with the top surface 44 of counter 42, and also include a scale 43. Scanner 11 is installed within checkout counter 42 so that substantially vertical aperture 30 faces a store employee.

Figure 4:
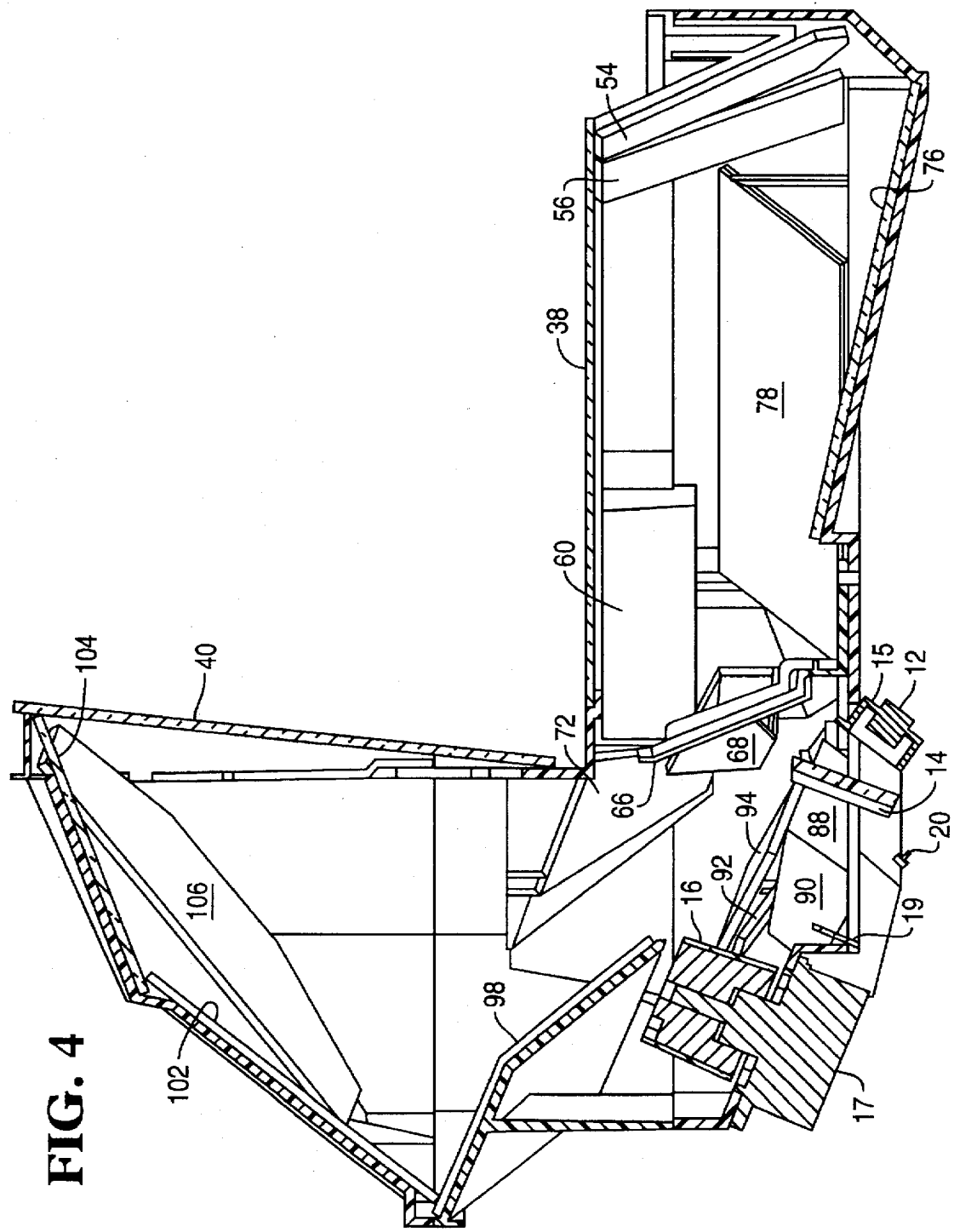
FIG. 4 is a sectional view of the scanner of the present invention along lines 4—4 of FIG. 3.

Referring now to FIGS. 3 and 4, the presently preferred arrangement of scanner components is shown in more detail. Laser 12 is preferably oriented at thirty-five degrees from the horizontal or X-axis as shown in FIG. 2. Laser 12 is mounted within a bracket 15 which attaches to the lower wall of scanner 11. Beam 22 contacts planoreflective surfaces 108–114 of mirrored spinner 16 (FIG. 4). Spinner axis 116 is preferably oriented at twenty-two and a half degrees from a vertical or Z-axis. Facets 108–114 are preferably oriented at two and half degrees, four degrees, seven degrees, and eight and a half degrees, respectively, from spinner axis 116. These angles cause spinner 16 to generate four different sets of scan lines (Table III below) and are chosen to balance spinner 16 as much as possible consistent with the goal of generating four different sets of scan lines.

Pattern mirrors 18 are all preferably flat mirrors. Scanning beams 24 from spinner 16 impact a first set of mirrors 50–72 and reflect therefrom to a second set of mirrors 74–98. Mirrors 80–98 within the second set further direct beams 24 to a third set of mirrors 100–106.

Figure 5:
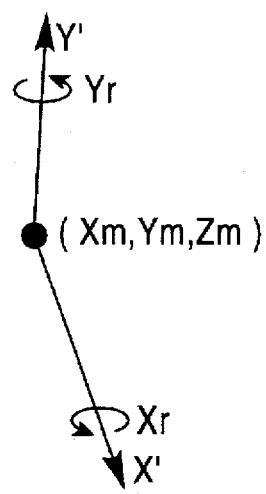
FIG. 5 is a reference coordinate system for determining one-suitable orientation for the group of pattern mirrors within the scanner of the present invention.
Figure 6:
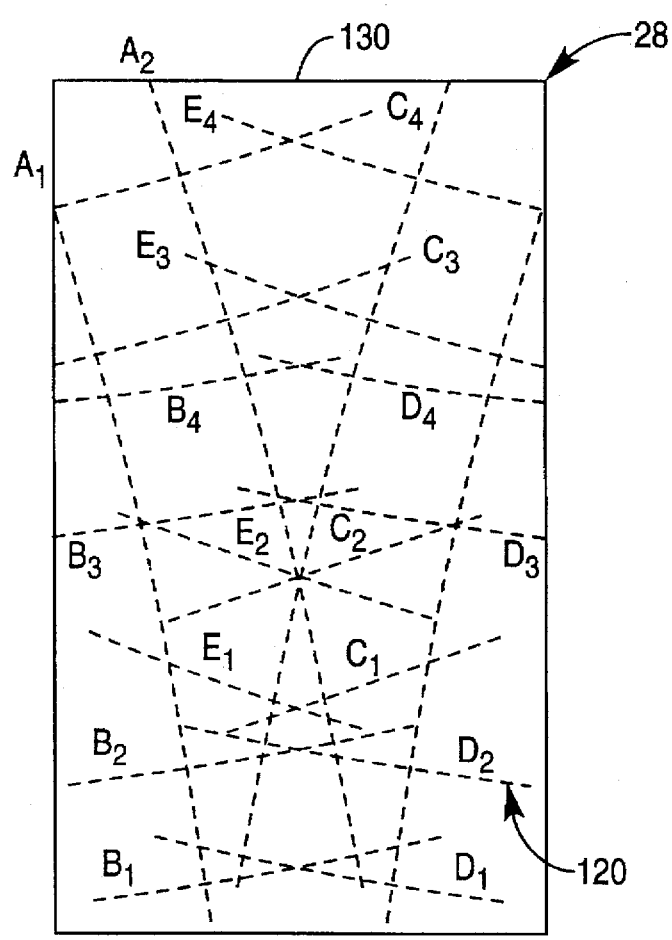
FIG. 6 is a plan view of the scan pattern emanating upwardly from a horizontal aperture.
Figure 7:
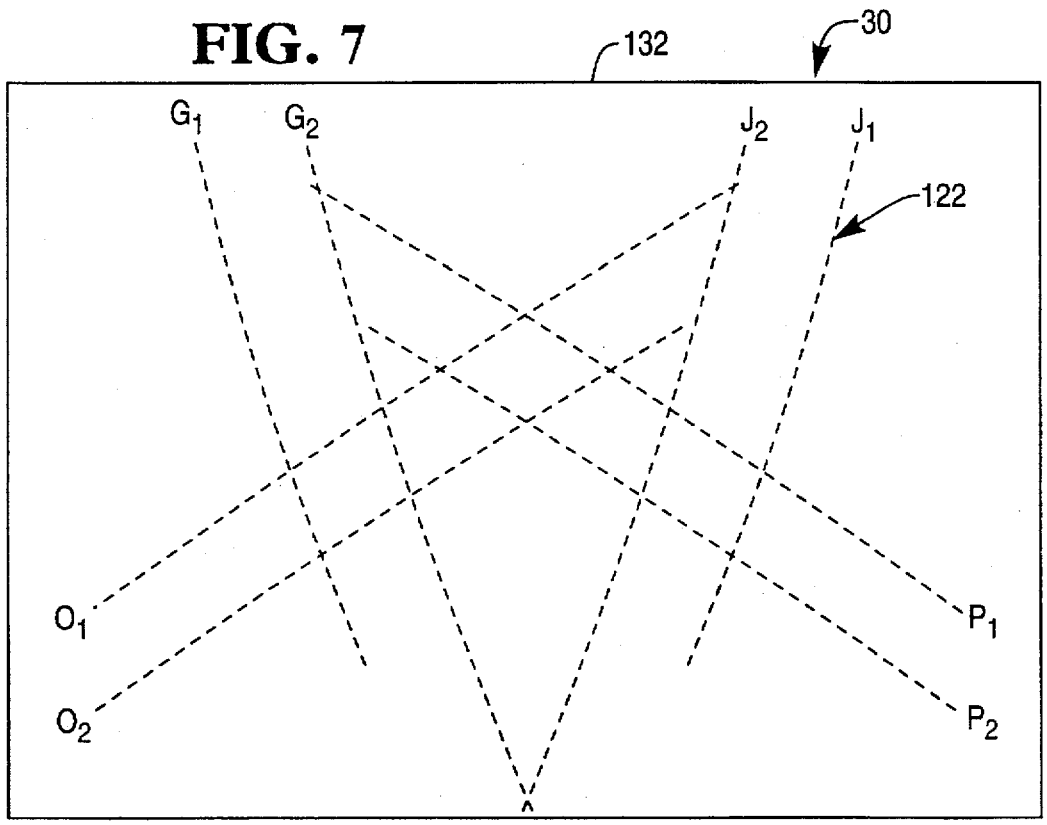
FIG. 7 is a plan view of a first scan pattern emanating outwardly from a vertical aperture.
Figure 8:
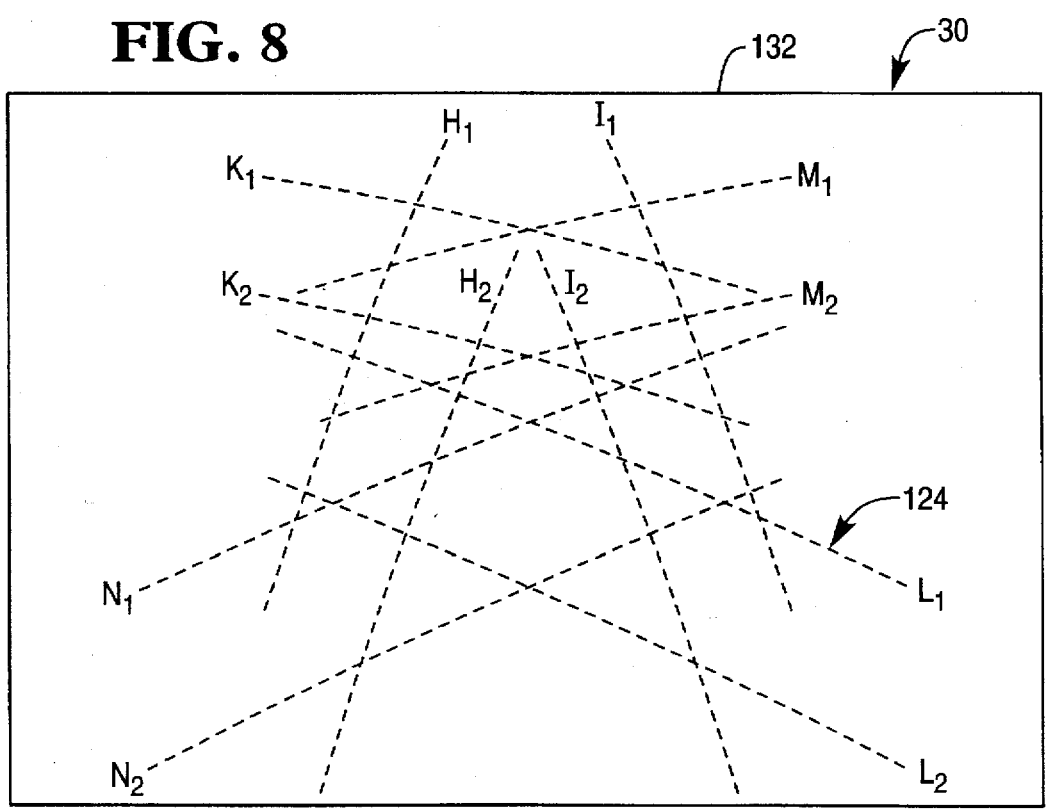
FIG. 8 is a plan view of a second scan pattern emanating outwardly from the vertical aperture.

The reference coordinate system for mirrors 50–106 is shown in FIGS. 2 and 5, and includes X, Y, and Z axes, with the Z-axis being out of the page. Coordinates $X_m$, $Y_m$, and $Z_m$ are measured in inches, and angles $X_r$ and $Y_r$, are measured in degrees, with positive angles being measured in a counter-clockwise direction. Pattern mirrors 18 are positioned or located with respect to this coordinate system as described below. Each mirror is first oriented parallel to the X-Y plane through a point ($X_m$, $Y_m$, $Z_m$). Each mirror is rotated through an angle $X_r$ about a line X parallel to the X-axis and containing the point ($X_m$, $Y_m$, $Z_m$). Each mirror is rotated through an angle $Y_r$ about a line Y parallel to the Y-axis and containing the point ($X_m$, $Y_m$, $Z_m$). Thus, these five variables uniquely define planes for mirrors 50–106 and are shown in Table I. Presently preferred values are shown.

Origin 0 is defined such that:

X=0 is on the centerline of the scanner;

Z=0 is on the centerline of the scanner; and

Y=0 is on the substantially horizontal surface 38.

TABLE I

| Mirror | $X_m$ | $Y_m$ | $Z_m$ | $X_r$ | $Y_r$ |
|---|---|---|---|---|---|
| 50 | +3.375 | −0.825 | +3.200 | +19.50 | −108.50 |
| 52 | +4.200 | −0.825 | +0.010 | +24.00 | −100.00 |
| 54 | +4.200 | −0.825 | −0.010 | +24.00 | −80.00 |
| 56 | +3.375 | −0.825 | −3.200 | +19.50 | −71.50 |
| 58 | −3.400 | −2.010 | +4.345 | +14.00 | −168.25 |
| 60 | −3.400 | −2.010 | −4.345 | +14.00 | −11.75 |

TABLE I-continued

| Mirror | Xm | Ym | Zm | Xr | Yr |
|---|---|---|---|---|---|
| 62 | −3.905 | −1.635 | +3.850 | −11.00 | −125.00 |
| 64 | −2.950 | −3.410 | +1.030 | +21.50 | −85.00 |
| 66 | −2.950 | −3.410 | −1.030 | +21.50 | −95.00 |
| 68 | −3.905 | −1.635 | −3.850 | −11.00 | −55.00 |
| 70 | −5.430 | −0.050 | +4.720 | +30.00 | −132.50 |
| 72 | −5.430 | −0.050 | −4.720 | +30.00 | −47.50 |
| 74 | −1.315 | −2.300 | +4.585 | −30.00 | −167.25 |
| 76 | +4.900 | −4.725 | +0.000 | −77.50 | +90.00 |
| 78 | −1.315 | −2.300 | −4.585 | −30.00 | −12.75 |
| 80 | −5.185 | −3.095 | +3.795 | −60.00 | +77.50 |
| 82 | −4.880 | −2.910 | +3.685 | −66.00 | +102.50 |
| 84 | −4.600 | −3.155 | +4.040 | −52.25 | +136.25 |
| 86 | −4.600 | −3.165 | +4.040 | −58.75 | +149.00 |
| 88 | −4.600 | −3.165 | −4.040 | −58.75 | +31.00 |
| 90 | −4.600 | −3.155 | −4.040 | −52.25 | +43.75 |
| 92 | −5.185 | −3.095 | −3.795 | −60.00 | +102.50 |
| 94 | −4.880 | −2.910 | −3.685 | −66.00 | +77.50 |
| 96 | −7.515 | +0.485 | +0.060 | −37.00 | +67.50 |
| 98 | −7.515 | +0.485 | −0.060 | −37.00 | +112.50 |
| 100 | −3.745 | +6.250 | +2.610 | +50.00 | +137.50 |
| 102 | −6.420 | +4.900 | +0.000 | +38.25 | +90.00 |
| 104 | −3.165 | +6.275 | +0.000 | +69.25 | +90.00 |
| 106 | −3.745 | +6.250 | −2.610 | +50.00 | +42.50 |

Table II shows orientation and location data for the laser, spinner, and photodetector:

TABLE II

| Component | Xm | Ym | Zm |
|---|---|---|---|
| Laser | −4.050 | −3.940 | +0.000 |
| Spinner | −6.875 | −2.175 | +0.000 |
| Photodetector | −4.645 | −4.580 | +0.000 |

In operation, laser beam 22 strikes each facet of mirrored spinner 16 in sequence. Table III summarizes the facet and mirrors involved in generating the forty scan lines (FIGS. 6–9) during one revolution of spinner 16. The forty scan lines are arranged in the sequence in which they are generated as spinner 16 rotates in a counter-clockwise direction as viewed from above.

TABLE III

| Scan Line | Facet | Primary Mirror | Secondary Mirror | Tertiary Mirror | Group | Sub-group |
|---|---|---|---|---|---|---|
| H1 | 108 | 70 | 82 | 104 | I | |
| O1 | 108 | 62 | 96 | 102 | II | IIa |
| L1 | 108 | 64 | 86 | 104 | I | |
| E1 | 108 | 50 | 76 | | III | IIIA |
| D1 | 108 | 52 | 76 | | III | IIIa |
| B1 | 108 | 54 | 76 | | III | IIIA |
| C1 | 108 | 56 | 76 | | III | IIIa |
| N1 | 108 | 66 | 88 | 104 | I | |
| P1 | 108 | 68 | 98 | 102 | II | IIa |
| I1 | 108 | 72 | 94 | 104 | I | |
| G1 | 112 | 70 | 80 | 100 | II | IIb |
| F2 | 112 | 58 | 78 | | III | IIIc |
| K1 | 112 | 64 | 84 | 104 | I | |
| E3 | 112 | 50 | 76 | | III | IIIa |
| D3 | 112 | 52 | 76 | | III | IIIa |
| B3 | 112 | 54 | 76 | | III | IIIa |
| C3 | 112 | 56 | 76 | | III | IIIa |
| M1 | 112 | 66 | 90 | 104 | I | |
| A2 | 112 | 60 | 74 | | III | IIIb |
| J1 | 112 | 72 | 92 | 106 | II | IIc |
| H2 | 110 | 70 | 82 | 104 | I | |
| O2 | 110 | 62 | 96 | 102 | II | IIa |
| L2 | 110 | 64 | 86 | 104 | I | |
| E2 | 110 | 50 | 76 | | III | IIIa |

TABLE III-continued

| Scan Line | Facet | Primary Mirror | Secondary Mirror | Tertiary Mirror | Group | Sub-group |
|---|---|---|---|---|---|---|
| D2 | 110 | 52 | 76 | | III | IIIa |
| B2 | 110 | 54 | 76 | | III | IIIa |
| C2 | 110 | 56 | 76 | | III | IIIa |
| N2 | 110 | 66 | 88 | 104 | I | |
| P2 | 110 | 68 | 98 | 102 | II | IIa |
| I2 | 110 | 72 | 94 | 104 | I | |
| G2 | 114 | 70 | 80 | 100 | II | IIb |
| F1 | 114 | 58 | 78 | | III | IIIc |
| K2 | 114 | 64 | 84 | 104 | I | |
| E4 | 114 | 50 | 76 | | III | IIIa |
| D4 | 114 | 52 | 76 | | III | IIIa |
| B4 | 114 | 54 | 76 | | III | IIIa |
| C4 | 114 | 56 | 76 | | III | IIIa |
| M2 | 114 | 66 | 90 | 104 | I | |
| A1 | 114 | 60 | 74 | | III | IIIb |
| J2 | 114 | 72 | 92 | 106 | II | IIc |

Referring now to FIGS. 6–9, horizontal scan pattern 120, vertical scan pattern 122, and top-down scan pattern 124 are shown. Some of scan lines 26 appear to be curved. This is because scan beams 24 from spinner 16 do not lie in a flat plane; they lie on the surface of a shallow cone. The curvature of scan lines 26 represents the intersection of that cone and a particular intersecting plane (e.g., an aperture). The amount of curvature depends on the relative angle between the projected cone and this plane. Since the cone of light projects at different angles for the various scan lines 26, scan lines 26 may appear to have different curvatures.

Horizontal scan pattern produces Group III scan lines which emanate from horizontal aperture 28. Scan lines within Sub-group IIIa include B1–B4, C1–C4, D1–D4, and E1–E4. Scan lines within Sub-group IIIb include A1–A2. Scan lines within Sub-group IIIc include F1–F2. Side 130 of aperture 28 is the operator side.

Vertical scan pattern 122 (FIG. 7) produces Group II scan lines which emanate from vertical aperture 30. Scan lines within Sub-group IIa include O1–O2 and P1–P2. Scan lines within Sub-group IIb include G1–G2. Scan lines within Sub-group IIc include J1–J2. Side 132 of aperture 30 is the top side.

Top-down scan pattern 124 (FIG. 8) produces Group I scan lines which emanate from vertical aperture 30 and include scan lines H1–H2, I1–I2, K1–K2, L1–L2, M1–M2, and N1–N2.

Figure 9:
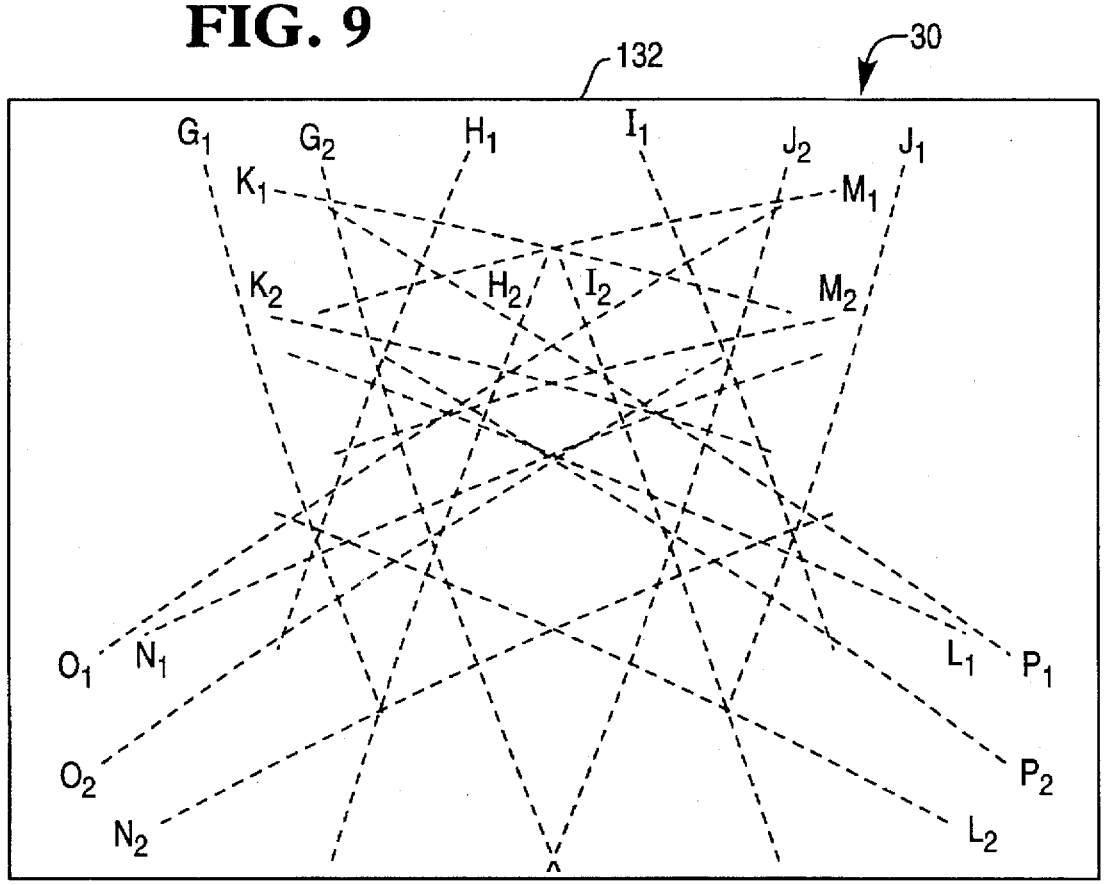
FIG. 9 is a plan view of the combined first and second scan patterns of FIGS. 7 and 8.

FIG. 9 illustrates the combined scan lines emanating from vertical aperture 30.

Figure 10:
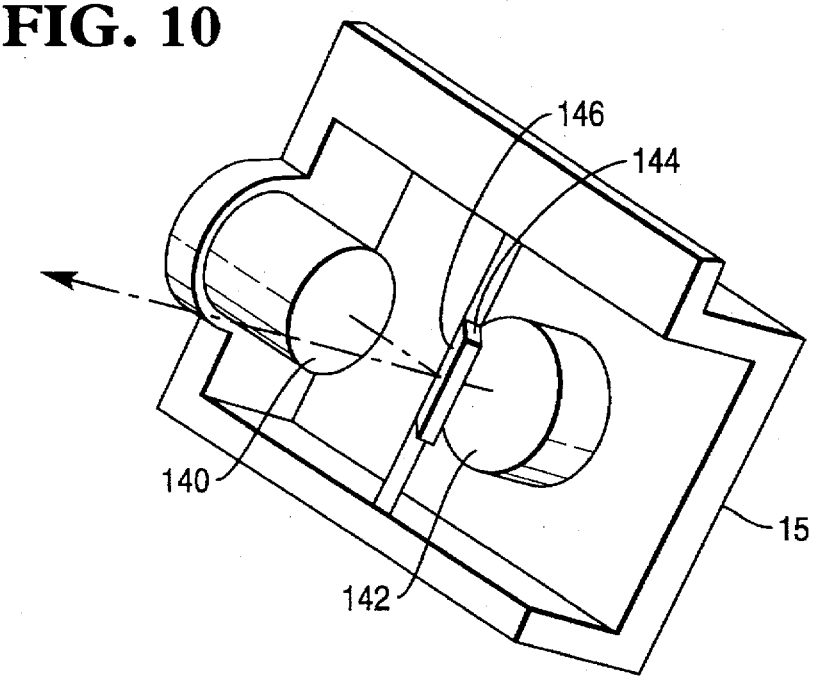
FIG. 10 is a perspective view of a laser assembly showing two lasers.

Turning now to FIG. 10, bracket 15 may contain two lasers 140 and 142. Lasers 140 and 142 are preferably combined such that their laser beams are co-linear. This is accomplished by using a transparent window 144 with one partially reflective side 146. Window 144 is mounted on a support member and placed in front of laser 140 so that its beam strikes window 144 at a forty-five degree incidence angle. Laser 142 is oriented so that its beam is orthogonal to the beam of laser 140 and has a forty-five degree incidence angle with window 146. The resulting co-linear beams of both lasers 140 and 142 are parallel to and substantially co-linear with the path of the beam of laser 12 in the single-laser embodiment.

Additional lasers may be easily incorporated by adding additional windows. Bracket 15 may be easily modified to accommodate three or more lasers.

Preferably, lasers 140 and 142 are substantially identical and have substantially identical foci. The foci are preferably offset to increase the effective depth of field of scanner 11.

Alternatively, the foci of lasers 140 and 142 may be different to enable scanner 11 to read bar codes of various spatial frequencies.

Although the invention has been described with particular reference to certain preferred embodiments thereof, variations and modifications of the present invention can be effected within the spirit and scope of the following claims.

What is claimed is:

1. An optical scanner comprising:

a housing having a substantially vertical surface containing a first aperture and a substantially horizontal surface containing a second aperture;

a single laser which produces a laser beam within the housing;

a polygon spinner having mirrored facets for reflecting the laser beam in a plurality of directions to produce a plurality of scanning beams including a first group of scanning beams, a second group of scanning beams, and a third group of scanning beams; and a plurality of pattern mirrors, including a plurality of groups of pattern mirrors, for reflecting the first group of scanning beams through the first aperture to produce a first scan pattern consisting of a plurality of intersecting scan lines, for reflecting the second group of scanning beams through the first aperture to produce a second scan pattern consisting of a plurality of intersecting scan lines, and for reflecting the third group of scanning beams through the second aperture to produce a third scan pattern consisting of a plurality of intersecting scan lines.

2. The optical scanner as recited in claim 1, further comprising:

an optical transceiver for passing the laser beam and for collecting reflected light from the scanned article; and a photodetector for generating signals representing the intensity of the light reflected from an article having a bar code label to be scanned.

3. The optical scanner as recited in claim 1, wherein the housing comprises:

a substantially horizontal surface containing the first aperture; and a substantially vertical surface containing the second aperture.

4. The optical scanner as recited in claim 1, wherein the laser comprises a laser diode.

5. The optical scanner as recited in claim 1, wherein the spinner has four planoreflective facets.

6. The optical scanner as recited in claim 5, wherein the four facets are oriented at different angles with respect to a predetermined reference.

7. The optical scanner as recited in claim 6, wherein the angles of pairs of opposite facing facets have values which tend to balance the spinner.

8. The optical scanner as recited in claim 1, wherein the pattern mirrors are flat.

9. The optical scanner as recited in claim 1, wherein the pattern mirrors comprise:

a first group of mirrors for reflecting the laser beam from the spinner;

a second group of mirrors for reflecting the laser beam from the first group of mirrors; and a third group of mirrors for reflecting the laser beam from some of the mirrors in the second group of mirrors.

10. An optical scanner comprising:

a housing including a substantially vertical surface containing a first aperture and a substantially horizontal surface containing a second aperture;

a laser diode for producing a laser beam;

an optical transceiver for passing the laser beam and for collecting reflected light from an article having a bar code label to be scanned;

a spinner having a plurality of sides oriented at different angles with respect to a predetermined reference for reflecting the laser beam in a plurality of directions to produce a plurality of scanning beams, and for directing light from the article to the optical transceiver; and a plurality of pattern mirror for reflecting a first group of scanning beams in a substantially horizontal direction through the first aperture, a second group of scanning beams in a substantially downward diagonal direction through the first aperture, and a third group of scanning beams in a substantially vertical direction through the second aperture and including a first group of mirrors for reflecting the laser beam from the spinner, a second group of mirrors for reflecting the laser beam from the first group of mirrors, and a third group of mirrors for reflecting the laser beam from some of the mirrors in the second group of mirrors; and a photodetector for generating signals representing the intensity of the light reflected from the article.

11. A method for scanning an article having a bar code label with minimal article orientation comprising the steps of:

(a) generating a single laser beam;

(b) providing a polygon spinner including a plurality of mirrored facets;

(c) reflecting the laser beam from the polygon spinner at a plurality of pattern mirrors within a scanner housing; and (d) reflecting a first group of scan lines from the pattern mirrors through a vertical aperture within the scanner housing to produce a first scan pattern consisting of a plurality of intersecting scan lines, reflecting a second group of scan lines from the pattern mirrors through said vertical aperture within the scanner housing to produce a second scan pattern consisting of a plurality of intersecting scan lines, and reflecting a third group of scan lines through a horizontal aperture within the scanner housing to produce a third scan pattern consisting of a plurality of intersecting scan lines.

12. The method as recited in claim 11, further comprising the step of:

(e) moving the article through the scan lines.

13. The method as recited in claim 11, wherein step (c) comprises the substep of:

(1) rotating a spinner having a plurality of mirrored facets in the path of the laser beam, each facet having a predetermined elevation angle; and (2) reflecting the laser beam from each of the facets in turn as the spinner rotates.

14. The method as recited in claim 13, wherein the spinner has four mirrored facets.

15. The method as recited in claim 13, wherein substep (c-1) comprises the substep of:

(A) energizing a motor coupled to the spinner.

16. The method as recited in claim 11, wherein step (d) comprises the substeps of:

(1) reflecting the laser beam from the spinner by a first group of the pattern mirrors; and (2) reflecting the laser beam from the first group of the pattern mirrors to a second group of the pattern mirrors; and (3) reflecting the laser beam from some of the pattern mirrors in the second group to a third group of the pattern mirrors.

17. The method as recited in claim 16 wherein substep (d) further comprises:

(3) reflecting a first group of the scan lines through the vertical aperture in a substantially horizontal direction through the first aperture;

(4) reflecting a second group of scanning beams in a substantially downward diagonal direction through the first aperture; and (5) reflecting a third group of the scan lines through the horizontal aperture in a substantially vertical direction through the second aperture.

18. A method of scanning an item having a bar code from multiple directions, comprising the steps of generating laser light;

providing a single multi-faceted mirrored polygon in a path of said laser light;

generating a first group of scanning beams, a second group of scanning beams, and a third group of scanning beams by reflecting said laser light off said mirror polygon;

directing said first group of scanning beams through a first transparent member oriented in a first plane to scan a surface of the item from one orthogonal direction;

directing said second group of scanning beams through the first transparent member oriented in the first plane to scan the item from a diagonal direction; and directing said third group of scanning beams through a second transparent member oriented in a second plane orthogonal to said first plane to scan the item from another orthogonal direction.

19. A method of scanning an item having a bar code from multiple directions, comprising the steps of providing a single multi-faceted mirror polygon in a scanner housing;

impinging laser light onto said mirror polygon;

rotating said mirror polygon;

generating a first group of scanning beams, a second group of scanning beams, and a third group of scanning beams by reflecting said laser light off said mirror polygon as it is being rotated;

directing said first group of scanning beams through a first transparent member oriented in a first plane to scan a surface of the item from a first orthogonal direction;

directing said second group of scanning beams through the first transparent member oriented in the first plane to scan the item from a diagonal direction; and directing said third group of scanning beams through a second transparent member oriented in a second plane at about ninety degrees to said first plane to scan the item from another orthogonal direction.

20. A method of scanning an item having a bar code label thereon from multiple directions, comprising the steps of:

generating laser light;

providing a single multi-faceted mirror polygon in a scanner housing;

producing a first group of scanning beams, a second group of scanning beams, and a third group of scanning beams by reflecting the laser light off the mirrored polygon;

directing the first, second, and third groups of scanning beams to a first group of pattern mirrors;

reflecting the first, second, and third groups of scanning beams off the first group of pattern mirrors towards a second group of pattern mirrors;

reflecting the first group of scanning beams off the second group of pattern mirrors and out a first surface to produce a first scan pattern consisting of a plurality of intersecting scan lines;

reflecting the second and third groups of scanning beams off the second group of pattern mirrors towards a third group of pattern mirrors;

reflecting the second group of scanning beams off the third group of pattern mirrors and out a second surface which is arranged orthogonally to the first surface to produce a second scan pattern consisting of a plurality of intersecting scan lines; and reflecting the third group of scanning beams off the third group of pattern mirrors and out the second surface to produce a third scan pattern consisting of a plurality of intersecting scan lines.

21. A bar code scanning system comprising:

a housing having a first window and a second window arranged generally orthogonally to one another;

a first set of pattern mirrors positioned adjacent the first window;

a second set of pattern mirrors positioned adjacent the second window, including first, second, and third subsets of pattern mirrors;

a laser within the housing which produces a laser beam;

a single scanning means within the housing comprising a mirror polygon; and a motor for rotating the mirror polygon;

wherein said mirror polygon reflects a first group of scanning beams across the first set of pattern mirrors and out the first window, reflects a second group of scanning beams across the first and third subsets of pattern mirrors and out the second window, and reflects a third group of scanning beams across the second and third subsets of pattern mirrors and out the second window.

22. A mirror assembly for use in an optical scanner having a substantially vertical aperture and a substantially horizontal aperture, comprising:

a first set of pattern mirrors including at least primary and secondary mirrors, and at least one tertiary mirror;

a second set of pattern mirrors including at least primary, secondary, and tertiary mirrors;

a third set of pattern mirrors including at least primary and secondary mirrors;

wherein each of the primary mirrors of the first set being disposed to receive an incident light beam at an oblique angle to reflect the incident beam onto at least one of the secondary mirrors of the first set;

wherein each of the secondary mirrors of the first set being disposed to receive an incident light beam at an oblique angle to reflect the incident beam onto at least one of the tertiary mirrors of the first set;

wherein the tertiary mirror of the first set being disposed at an oblique angle with respect to an incident light beam from at least one of the secondary mirrors of the first set, and positioned to reflect the incident beam outwardly and downwardly through said substantially vertical aperture;

wherein each of the primary mirrors of the second set being disposed to receive an incident light beam at an oblique angle to reflect the incident beam onto at least one of the secondary mirrors of the second set;

wherein each of the secondary mirrors of the second set being disposed to receive an incident light beam at an oblique angle to reflect the incident beam onto at least one of the tertiary mirrors of the second set;

wherein each of the tertiary mirrors of the second set being disposed at an oblique angle with respect to an incident light beam from at least one of the secondary mirrors of the second set, and positioned to reflect the incident beam through said substantially vertical aperture;

wherein each of the primary mirrors of the third set being disposed to receive an incident light beam at an oblique angle to reflect the incident beam onto at least one of the secondary mirrors of the third set;

wherein each of the secondary mirrors of the third set being disposed to receive an incident light beam at an oblique angle to reflect the incident beam through said substantially horizontal aperture;

wherein the primary mirrors of the first set include a plurality of generally trapezoidal mirrors;

wherein the secondary mirrors of the first set operate to receive a light beam from said generally trapezoidal mirrors; and wherein the tertiary mirror of the first set is a generally trapezoidal mirror which operates to receive a light beam from said secondary mirrors of the first set.

23. A mirror assembly for use in an optical scanner having a substantially horizontal aperture and a substantially vertical aperture, comprising:

a first set of pattern mirrors including at least primary and secondary mirrors, and at least one tertiary mirror;

a second set of pattern mirrors including at least primary, secondary, and tertiary mirrors;

a third set of pattern mirrors including at least primary and secondary mirrors;

a source of light beams;

wherein the primary mirrors of the first set are disposed at oblique angles with respect to an incident light beam from said source, to reflect the light beam onto the secondary mirrors of the first set;

wherein the secondary mirrors of the first set are disposed at oblique angles with respect to an incident light beam from said source, to reflect the light beam onto the tertiary mirror of the first set;

wherein the tertiary mirror of the first set is disposed at oblique angles with respect to an incident light beam from the secondary mirrors of the first set, and positioned to reflect light outwardly and downwardly through said substantially vertical aperture;

wherein the primary mirrors of the second set are disposed at oblique angles with respect to an incident light beam from said source, to reflect light onto the secondary mirrors of the second set;

wherein the secondary mirrors of the second set are disposed at oblique angles with respect to an incident light beam from said source, to reflect light onto the tertiary mirrors of the second set;

wherein the tertiary mirrors of the second set are disposed at oblique angles with respect to an incident light beam from the secondary mirrors of the second set, and positioned to reflect light outwardly through said substantially vertical aperture;

wherein the primary mirrors of the third set are disposed at oblique angles with respect to an incident light beam from said source, to reflect light onto the secondary mirrors of the third set;

wherein the secondary mirrors of the third set are disposed at oblique angles with respect to an incident light beam from the primary mirrors of the third set, and positioned to reflect light outwardly through said substantially horizontal aperture;

wherein the primary mirrors of the first set include a plurality of generally trapezoidal mirrors;

wherein the secondary mirrors of the first set operate to receive a light beam from said generally trapezoidal mirrors; and wherein the tertiary mirror of the first set is a generally trapezoidal mirror which operates to receive a light beam from said secondary mirrors of the first set.

24. An optical scanner for scanning the surfaces of an object by means of light beams from a substantially vertical aperture and a substantially horizontal aperture, comprising:

a housing having said substantially vertical and horizontal apertures;

a rotating mirror polygon positioned at a predetermined location within an area in said housing;

at least first, second, and third sets of pattern mirrors located within the housing along the periphery of said area;

said first set of pattern mirrors being located in one region along said periphery, and having primary and secondary mirrors, and at least one tertiary mirror for reflecting light beams outwardly and downwardly through said substantially vertical aperture;

said second set of pattern mirrors being located in a similar region along said periphery, and having primary, secondary, and tertiary mirrors for reflecting light beams outwardly through said substantially vertical aperture;

said third set of pattern mirrors being located in a different region along said periphery, and having primary and secondary mirrors for reflecting light beams through said substantially horizontal aperture;

wherein the primary mirrors of the first set include a plurality of generally trapezoidal mirrors;

wherein the secondary mirrors of the first set operate to receive a light beam from said generally trapezoidal mirrors; and wherein the tertiary mirror of the first set is a generally trapezoidal mirror which operates to receive a light beam from said secondary mirrors of the first set.

25. An optical scanner as in claim 24, in which said rotating mirror polygon produces light beams that pass radially outward therefrom to scan the primary mirrors of the first set of pattern mirrors, one after another, to scan the primary mirrors of the second set of pattern mirrors, one after another, and to scan the primary mirrors of the third set of pattern mirrors, one after another.

26. An optical scanner as in claim 24, in which said rotating mirror polygon reflects light beams onto the primary mirrors of said first, second, and third sets of pattern mirrors as it rotates.

27. An optical scanner as in claim 24, in which said rotating mirror polygon reflects light onto the primary mirrors of said first, second, and third sets of pattern mirrors.

28. A mirror assembly for use in an optical scanner having a substantially vertical aperture and a substantially horizontal aperture, comprising:

a first set of pattern mirrors including at least primary and secondary mirrors, and at least one tertiary mirror;

a second set of pattern mirrors including at least primary, secondary, and tertiary mirrors;

a third set of pattern mirrors including at least primary and secondary mirrors;

a source of light;

the primary mirrors of the first set being disposed at oblique angles with respect to the source of light, to reflect the source of light onto the secondary mirrors of the first set;

the secondary mirrors of the first set being disposed at oblique angles with respect to incident light beams from the primary mirrors of the first set, and positioned to reflect the light beams onto the tertiary mirror of the first set;

the tertiary mirror of the first set being disposed at oblique angles with respect to incident light beams from the secondary mirrors of the first set, and positioned to reflect the light beams outwardly and downwardly through said substantially vertical aperture;

the primary mirrors of the second set being disposed at oblique angles with respect to the source of light, to reflect the source of light onto the secondary mirrors of the second set;

the secondary mirrors of the second set being disposed at oblique angles with respect to the source of light, to reflect the source of light onto the tertiary mirrors of the second set;

the tertiary mirrors of the second set being disposed at oblique angles with respect to incident light beams from the secondary mirrors of the second set, and positioned to reflect the light beams outwardly through said substantially vertical aperture;

the primary mirrors of the third set being disposed at oblique angles with respect to the source of light, to reflect the source of light onto the secondary mirrors of the third set;

the secondary mirrors of the third set being disposed at oblique angles with respect to the source of light, to reflect the source of light beams through said substantially horizontal aperture; and the primary mirrors of the first set including two pairs of opposite side mirrors.

29. A mirror assembly as in claim 28, wherein the secondary mirrors of the first set include opposite groups of three mirrors, wherein each secondary mirror operates to receive a light beam from one of the primary mirrors of the first set.

30. A mirror assembly as in claim 28 in which at least two of the secondary mirrors of the first set operate to receive a light beam from a common primary mirror of the first set.

31. An optical scanner as in claim 28, in which the source of light includes a rotating mirrored surface that directs light onto the primary mirrors of said first, second, and third sets of pattern mirrors as it rotates.

32. An optical scanner as in claim 28, in which the source of light includes a rotating polygon with mirrors on each its sides to reflect light onto the primary mirrors of said first, second, and third sets of pattern mirrors.

33. An optical scanner comprising:

a housing including a substantially vertical surface containing a first aperture and a substantially horizontal surface containing a second aperture;

first and second lasers for producing first and second laser beams;

an optical transceiver for passing the laser beam and for collecting reflected light from an article having a bar code label to be scanned;

a spinner having a plurality of sides oriented at different angles with respect to a predetermined reference for reflecting the first and second laser beams in a plurality of directions to produce a plurality of scanning beams, and for directing light from the article to the optical transceiver; and a plurality of pattern mirrors for reflecting a first group of scanning beams in a substantially horizontal direction through the first aperture, a second group of scanning beams in a substantially downward diagonal direction through the first aperture, and a third group of scanning beams in a substantially vertical direction through the second aperture and including a first group of mirrors for reflecting the laser beam from the spinner, a second group of mirrors for reflecting the laser beam from the first group of mirrors, and a third group of mirrors for reflecting the first and second laser beams from some of the mirrors in the second group of mirrors; and a photodetector for generating signals representing the intensity of the light reflected from the article.

34. An optical scanner as recited in claim 33, further comprising:

control circuitry which alternately applies power to the first and second lasers.

35. An optical scanner as recited in claim 33, wherein the first and second lasers have different depths of field.

* * * * *

Adverse Decision In Interference

Patent No. 5,684,289, Paul O. Detwiler, Barry M. Mergenthaler, Hong Tang, OPTICAL SCANNER HAVING ENHANCED ITEM SIDE COVERAGE, Interference No. 104,631, final judgment adverse to the patentees rendered June 7, 2001, as to claims 1-21 and 33-35.

*(Official Gazette July 10, 2001)*

Disclaimer

5,684,289 — Detwiler et al., Lawrenceville, GA (US). OPTICAL SCANNER HAVING ENHANCED ITEM SIDE COVERAGE. Patent dated November 4, 1997, Disclaimer filed May 27, 2001, by the Inventor.

Hereby enters this disclaimer to claims 2-17, 19-21, 33-35, of said patent.

(*Official Gazette June 14, 2005*)